Dec. 4, 1934.   F. A. VOLZ   1,983,202
COILABLE MEASURING RULE
Filed Feb. 10, 1933
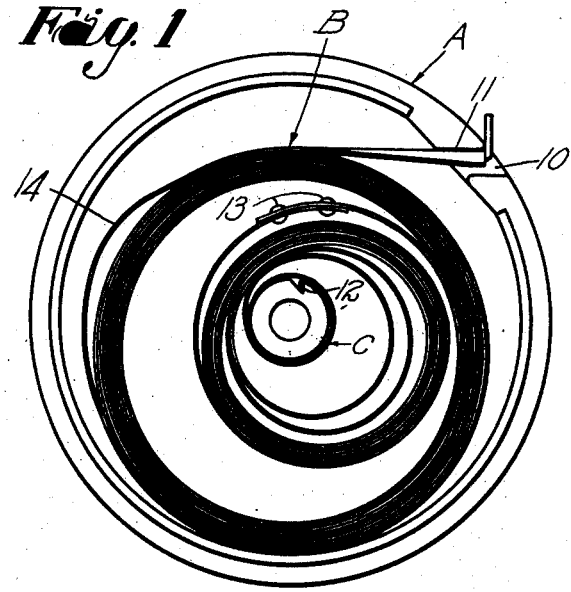
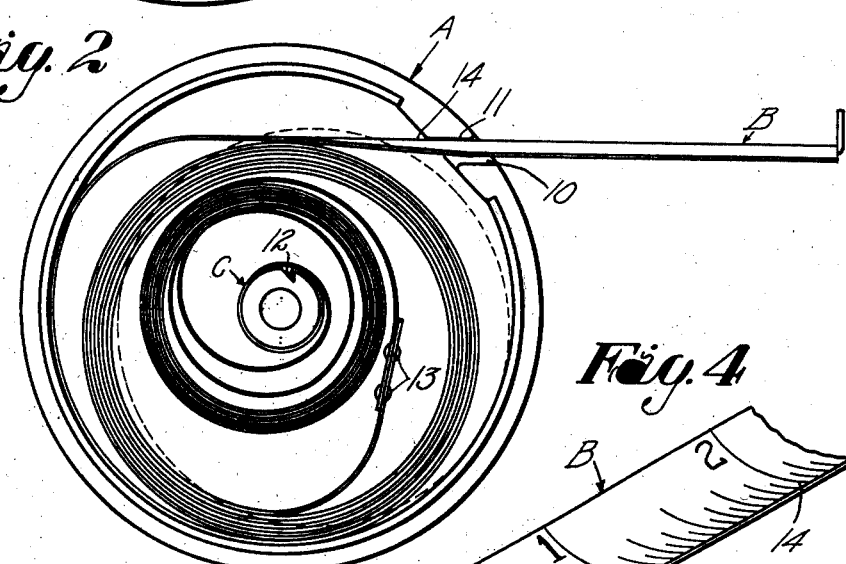
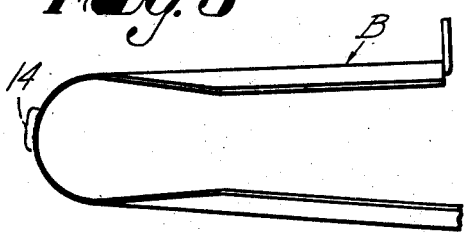
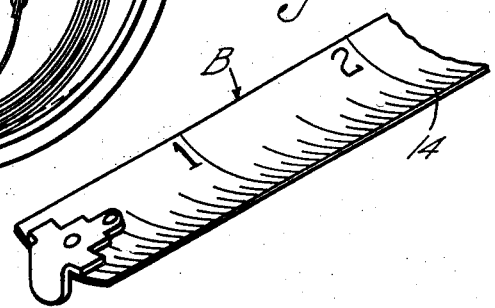
Inventor
*Frederick A. Volz*
By
Attorney Patented Dec. 4, 1934

1,983,202

UNITED STATES PATENT OFFICE 1,983,202

COILABLE MEASURING RULE

Frederick A. Volz, New Britain, Conn., assignor to The Stanley Works, New Britain, Conn., a corporation of Connecticut Application February 10, 1933, Serial No. 656,114

6 Claims. (Cl. 33—137)

The present invention relates to coilable measuring rules of the type which includes a measuring tape adapted to be coiled within a suitable casing or holder. The improvements of the present invention have particular application in connection with a measuring tape having a bent transverse form, such as a concavo-convex form, so that the tape has an inherent tendency to resist bending. In the present instance, resilient winding means are provided for aiding the measuring tape into coils within the casing, and this resilient means has a tension which only substantially counterbalances the resistance of friction of the parts and the tendency of the measuring tape to resist bending so that it is necessary to manually push the measuring tape into the casing when it is desired to wind the same therein.

It is an object of this invention to provide an improved device of this character in which the measuring tape, when it has been manually pushed almost to its fully wound up position in the holder, will then be automatically snapped or moved to its complete wound up position in the holder. With this thought in mind, the present invention contemplates providing the measuring tape adjacent its outer free end with a portion of lesser tendency to resist bending so that when the tape has been pushed into the casing to such an extent that this portion is brought onto the coil, the free end portion of the measuring tape will be automatically moved into the holder. With such a construction, it is obvious that it is not necessary, as it has been heretofore, to provide any cooperating means between the holder and the hook usually secured to the outer free end of the measuring tape to prevent the accidental withdrawal of the measuring tape from the holder. If the measuring tape be accidentally withdrawn to a slight extent from the holder, the measuring tape, due to its more easily bendable portion and the influence of the winding means, will be immediately and automatically snapped back into the holder.

It is another object of the present invention to provide an improved device of this character which is simple in construction, is cheap to manufacture, is effective in operation and durable in use.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein I have shown, for illustrative purposes, one of the embodiments which the present invention may take, Fig. 1 is a side view of a device, on an enlarged scale, constructed according to the present invention with one-half of the holder removed and showing the measuring tape fully wound into the holder;

Fig. 2 is a view similar to Fig. 1 but showing the measuring tape as partly wound into the holder;

Fig. 3 is an enlarged detail view of the outer free end of the measuring tape and shows one method which may be employed to make the rule more easily bendable at the place desired; and Fig. 4 is a view of the free end of the measuring tape.

Referring more particularly to the drawing, A generally indicates the casing holder or supporting means, B the measuring tape adapted to be coiled within the holder, and C the resilient winding means for aiding the measuring tape B into coils within the holder. The holder A may be of the usual construction and is provided with the customary transverse entrance slot 10 having the rear edge 11. The resilient winding strip C is disposed within the holder A and has its inner end anchored, as at 12, in the usual manner and has its outer free end secured, as by rivets 13, to the inner end of the measuring tape B.

The measuring tape B may be made of steel and has a bent transverse form, such as a concavo-convex form, so that it has an inherent tendency to resist bending. When steel rules of this type are coiled, they receive, due to the longitudinal flexure, a transverse flexure which straightens the cross sectional arch into a flat ribbon-like state and, at the point of tangency on the coil, the tape tends to assume its original arched form in cross section, which reacts to unwind the coil. The winding strip C is connected to the inner end of the measuring tape in order to prevent the coiled portions of the tape from expanding to such an extent as to produce an undesirable degree of frictional engagement between the convolutions of the tape and the wall of the casing. The resilience of the tape and the resilience of the spring are preferably so correlated as to give what is known as a push-pull rule; that is, a rule wherein the tape may be manually moved into and out of the casing and the rule is maintained substantially in any desired extended position.

Heretofore, in measuring devices of this sort, if the free end of the tape extended somewhat beyond the casing, it remained there, due to the balanced condition of the parts, and not infrequently the projecting end of the tape would be damaged. Considerable inconvenience has been occasioned by the usual hook, which is provided on the free end of the tape, accidentally engaging with clothing or other objects and thereby causing inadvertent withdrawal, to a slight extent, of the hook from its holder, and the tape remaining in that condition. Various expedients have been resorted to in an endeavor to prevent this accidental withdrawal of the tape from its holder, among which is the provision of interlocking means between the casing and the hook on the measuring tape.

In accordance with the present invention, the arrangement is such that the tail or free end portion of the tape, say the last couple inches thereof, is automatically drawn into the casing. Thus, when the tape has been manually pushed almost to its full wound-up position, it will be automatically snapped or moved to its complete wound position; also, in the event that the end of the tape, after the tape has been wound up, should be accidentally drawn from the casing a slight distance, it will automatically snap back into the casing—which means that in no event will the last inch or two of the tape remain out of the casing and in a position where it is liable to be injured or damaged.

To these ends, the measuring tape is provided at the desired point, say about the two-inch mark, with a portion which has less resistance to flattening out transversely when bent longitudinally—thus, at this point, reducing somewhat the natural tendency of the rule to assume its arch-like form without, however, materially affecting the stiffness of that portion against buckling when the portion is in extended or rod-like form. For convenience, this portion of the rule is referred to as having a lesser tendency to resist bending and may be given that characteristic by bending the rule longitudinally, as shown in Fig. 3, into a loop the radius of curvature of which is somewhat less than the radius of the natural cross sectional curvature of the tape, the radius of the loop, however, not being sufficient to give the rule a longitudinal curved set which would overcome the transverse curved set; that is to say, after the rule is released from its loop form, it will assume a rod-like or straight condition in which the natural transverse curvature of the rule is substantially maintained.

In the use of the device, assuming that the measuring tape has been withdrawn and it is desired to rewind it into the casing, the tape is manually pushed into the casing (this operation being aided by the winding means C) until the portion 14 of the tape will approximately engage at its point of tangency with the coils previously wound. The free end of the measuring tape is now automatically moved or snapped into fully wound position within the holder. This action may be explained by the fact that the outermost coil of the tape tends to unwind with a rotary sweeping movement, that is, the free extended end of the tape shown in Fig. 2 tends to swing or sweep in a counter-clockwise direction, such movement being prevented, however, by the rear edge 11 of the slot 10. When the portion 14 of reduced stiffness is brought into engagement with the previously wound convolution of the tape, this portion will more or less readily flatten out so that the outer convolution of the coiled tape, due to its natural tendency to unwind with a sweeping movement, will expand, resulting in the free end of the tape being automatically snapped into the casing. In fact, during this snapping movement, the coil will move or rotate bodily from substantially the full position shown in Fig. 2 to the dotted line position shown in that figure. In the event that the free end of the tape is accidentally withdrawn a short distance from the holder, the tape, when released, will be immediately snapped back into the holder.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A transversely curved spring rule adapted to be formed into a substantially spirally wound coil and having an inherent tendency to assume a rectilinear rod-like state, said rule having adjacent but spaced from its outer or free end a portion of a lesser tendency to assume its natural transverse curvature when bent longitudinally.

2. In combination, a resilient measuring tape having a transverse curvature and an inherent tendency to assume and retain a rectilinear state, and means for supporting said tape in a coiled condition, said tape having adjacent but spaced from its outer end a portion of lesser tendency to resist bending.

3. In combination, a resilient measuring tape having a concavo-convex form in cross section and an inherent tendency to assume and retain a rectilinear state, and means for supporting said tape in an externally coiled condition, said tape having adjacent, but spaced from, its free end a portion having less resistance to flattening out transversely when bent longitudinally but having sufficient resistance to resist buckling when in extended form.

4. In combination, a resilient measuring tape having a transverse curvature and an inherent tendency to assume a rectilinear state, means for supporting said tape in a coiled condition, and tensioning means urging said tape into coiled condition, said tape having adjacent but spaced from its free end a portion of lesser tendency to resist bending.

5. In combination, a resilient measuring tape having a transverse curvature and an inherent tendency to assume and retain a rectilinear state, tensioning means for aiding in winding said tape into coil form, the resilience of the tape and the resilience of the spring being so correlated that the strength of the spring is sufficient to facilitate the coiling of said tape when the extended portion of the tape is fed into the casing by exerting thereon lengthwise thrust whereby any undesirable degree of frictional engagement between the tape and the wall of the casing is avoided, said tape having adjacent, but spaced from, its free end a portion of lesser tendency to assume its natural transverse curvature when bent longitudinally.

6. In combination, a casing having an entrance slot, a measuring tape adapted to be moved through said slot and to be coiled within said casing, said tape having a transverse curvature and an inherent tendency to assume a rectilinear state, tensioning means for assisting in winding said tape into a coil, the resilience of the tape and the resilience of the spring being so correlated that the strength of the spring is sufficient to facilitate the coiling of said tape when the extended portion of the tape is fed into the casing by exerting thereon lengthwise thrust whereby any undesirable degree of frictional engagement between the tape and the wall of the casing is avoided, said tape having adjacent its free end a portion having a lesser tendency to resist bending than the remainder of the tape.

FREDERICK A. VOLZ.